United States Patent [19]

Oda

[11] Patent Number: 4,805,203

[45] Date of Patent: Feb. 14, 1989

[54] CORDLESS TELEPHONE SYSTEM

[75] Inventor: Toshiaki Oda, Tokyo, Japan

[73] Assignee: NEC Corporation, Tokyo, Japan

[21] Appl. No.: 42,907

[22] Filed: Apr. 27, 1987

[30] Foreign Application Priority Data

Apr. 25, 1986 [JP] Japan ................................. 61-94882

[51] Int. Cl.$^4$ ........................ H04M 11/00; H04B 1/16
[52] U.S. Cl. ....................................... 379/61; 379/63; 455/343
[58] Field of Search ...................... 379/60, 61, 62, 63; 455/343

[56] References Cited

U.S. PATENT DOCUMENTS

| | | | |
|---|---|---|---|
| 3,692,952 | 9/1972 | Leonard | 379/63 |
| 4,656,653 | 4/1987 | Oda et al. | 379/61 |
| 4,672,658 | 6/1987 | Kavehrad et al. | 376/61 |
| 4,679,244 | 7/1987 | Kawasaki et al. | 455/343 |
| 4,682,351 | 7/1987 | Makino | 379/61 |

Primary Examiner—Jin F. Ng
Assistant Examiner—David H. Kim
Attorney, Agent, or Firm—Sughrue, Mion, Zinn, Macpeak, and Seas

[57] ABSTRACT

A cordless telephone system is provided including a base communication unit and portable communication units. The base communication unit is connected to a number of telephone lines, and has the same number of radio transceivers as the telephone lines. Each of the portable communication units is connected to a respective one of the transceivers of the base communication unit by a cordless communication link. In operation, each of the portable communication units is intermittently rendered operative at a particular timing and a predetermined period which are designated by a first signal. The first signal is produced in the base communication unit, and is based on the number of portable communication units turned ON. The particular timing and predetermined period are changed in response to a second signal which is produced in the base communication unit, and which is based on the number of portable communication units turned ON, and on the number of wireless communication units being used.

5 Claims, 7 Drawing Sheets

FIG. 4A TEL 1 "ON"

FIG. 4B TEL 2 "ON"

FIG. 4C TEL 3 "ON"

FIG. 4D TEL 4 "ON"

FIG. 4E TEL 5 "ON"

FIG.5A SIGNAL WITHIN BASE UNIT

FIG.5B TEL 1

FIG.5C TEL 2

FIG.5D TEL 3

FIG.5E TEL 4

FIG.5F TEL 5

① : CALL RECEIPT
② : SEND CALL RECEIPT SIGNAL TO TEL3
③ : CONNECT TO BASE UNIT
④ : SEND BS PERIOD DESIGNATE SIGNAL TO TEL4
⑤ : RECEIVE BS PERIOD DESIGNATE SIGNAL
⑥ : SEND BS PERIOD DESIGNATED SIGNAL TO TEL5
⑦ : RECEIVE BS PERIOD DESIGNATE SIGNAL
⑧ : SEND BS PERIOD DESIGNATE SIGNAL TO TEL1
⑨ : RECEIVE BS PERIOD DESIGNATE SIGNAL
⑩ : SEND BS PERIOD DESIGNATE SIGNAL TO TEL2
⑪ : RECEIVE BS PERIOD DESIGNATE SIGNAL

FIG. 6A

FIG. 6B TEL 1

FIG. 6C TEL 2

FIG. 6D TEL 3

FIG. 6E TEL 4

FIG. 6F TEL 5

① : CALL ORIGINATION
② : CONNECT TO TEL 5
③ : SEND BS PERIOD DESIGNATE SIGNAL TO TEL 1
④ : RECEIVE BS PERIOD DESIGNATE SIGNAL
⑤ : SEND BS PERIOD DESIGNATE SIGNAL TO TEL 2
⑥ : RECEIVE BS PERIOD DESIGNATE SIGNAL
⑦ : SEND BS PERIOD DESIGNATE SIGNAL TO TEL 3
⑧ : RECEIVE BS PERIOD DESIGNATE SIGNAL
⑨ : SEND BS PERIOD DESIGNATE SIGNAL TO TEL 4
⑩ : RECEIVE BS PERIOD DESIGNATE SIGNAL

① : END OF COMMUNICATION (HOOK SWITCH ON)
② : SEND BS PERIOD DESIGNATE SIGNAL TO TEL5
③ : RECEIVE BS PERIOD DESIGNATE SIGNAL
④ : SEND BS PERIOD DESIGNATE SIGNAL TO TEL1
⑤ : RECEIVE BS PERIOD DESIGNATE SIGNAL
⑥ : SEND BS PERIOD DESIGNATE SIGNAL TO TEL2
⑦ : RECEIVE BS PERIOD DESIGNATE SIGNAL
⑧ : SEND BS PERIOD DESIGNATE SIGNAL TO TEL3
⑨ : RECEIVE BS PERIOD DESIGNATE SIGNAL
⑩ : SEND BS SIGNAL DESIGNATE SIGNAL TO TEL4
⑪ : RECEIVE BS PERIOD DESIGNATE SIGNAL

CORDLESS TELEPHONE SYSTEM

BACKGROUND OF THE INVENTION

The present invention relates to a cordless or wireless telephone system constituted by a base communication unit which is connected to a telephone line connection, and a portable communication unit which is connected to the base unit by a wireless communication link.

A prior art cordless telephone system usually comprises a base communication unit and a corresponding portable communication unit, and the portable unit performs battery saving (BS) operation at a specific period in order to enhance the service life of battery adapted to power the portable unit. This, however, brings about a drawback that a plurality of telephone lines cannot be used at a time unless the same number of cordless telephone systems as the telephone lines are installed. Another problem is that the total power saving performance attainable with the prior art system is limited because the BS operations of the independent portable units occur at the same period and at entirely different timings.

SUMMARY OF THE INVENTION

It is therefore an object of the present invention to provide a cordless telephone system which, consisting of a base unit connected to a telephone system network and portable units each being connected to the base unit by a wireless communication link, achieves high power saving efficiency.

It is another object of the present invention to provide a generally improved cordless telephone system.

A cordless telephone system of the present invention comprises a base communication unit connected to a plurality of telephone lines and having the same number of radio transceivers as the telephone lines, and portable communication units equal in number to the telephone lines and each being connected to a respective one of the transceivers of the base communication unit by a cordless communication link. Each of the portable communication units performs intermittent receipt at a particular timing assigned thereto and at a predetermined period which are synchonous to a signal which is generated in the base communication unit. The timing and period of intermittent receipt are changed in response to a signal which is transmitted from the base communication unit based on the number of wireless communication links used.

The present invention provides a battery saving method in a base communication unit connected to a plurality of telephone lines and having the same number of radio transceivers as the telephone lines and a controller provided with a storage for controlling the transceivers, and portable communication units equal in number to the telephone lines and each being connected to a respective one of the transceivers of the base communication unit by a cordless communication link. The method comprises the steps of: (a) turning a power source of the base communication unit ON; (b) turning a power source of a first one of the portable communication units ON and sending a first portable unit power ON signal to the base communication unit; (c) in response to the first portable unit power ON signal, sending a predetermined battery saving (BS) period designate signal from the base comunication unit to the first portable communication unit at a first timing while, at the same time, registering the first portable communication unit in the storage of the controller of the base communication unit; (d) in response to the BS period designate signal, causing the first portable communication unit to enter into a BS operation at a second timing and at a first period designated; (e) turning a power source of a second one of the portable communication units ON and sending a second portable unit power ON signal to the base communication unit; (f) in response to the second portable unit power ON signal, causing the base communication unit to send the BS period designate signal to the first and second portable communication units at a third and a fourth timing, respectively, while at the same time registering the first and second portable communication units in the storage of the base communication unit in an order of power source ON; (g) in response to the BS period designate signal, changing the first period to a second period designated so as to cause the first portable communication unit to perform a BS operation at a fifth timing and at a second period while, at the same time, causing the second portable communication unit to perform a BS operation at a sixth timing and the second period; and (h) applying the sequence of steps sequentially to a third one and onward of the portable communication units to cause the third portable communication unit and others to individually perform BS operations.

The above and other objects, features and advantages of the present invention will become more apparent from the following detailed description taken with the accompanying drawings.

DESCRIPTION OF THE PREFERRED EMBODIMENT

Figure 1:
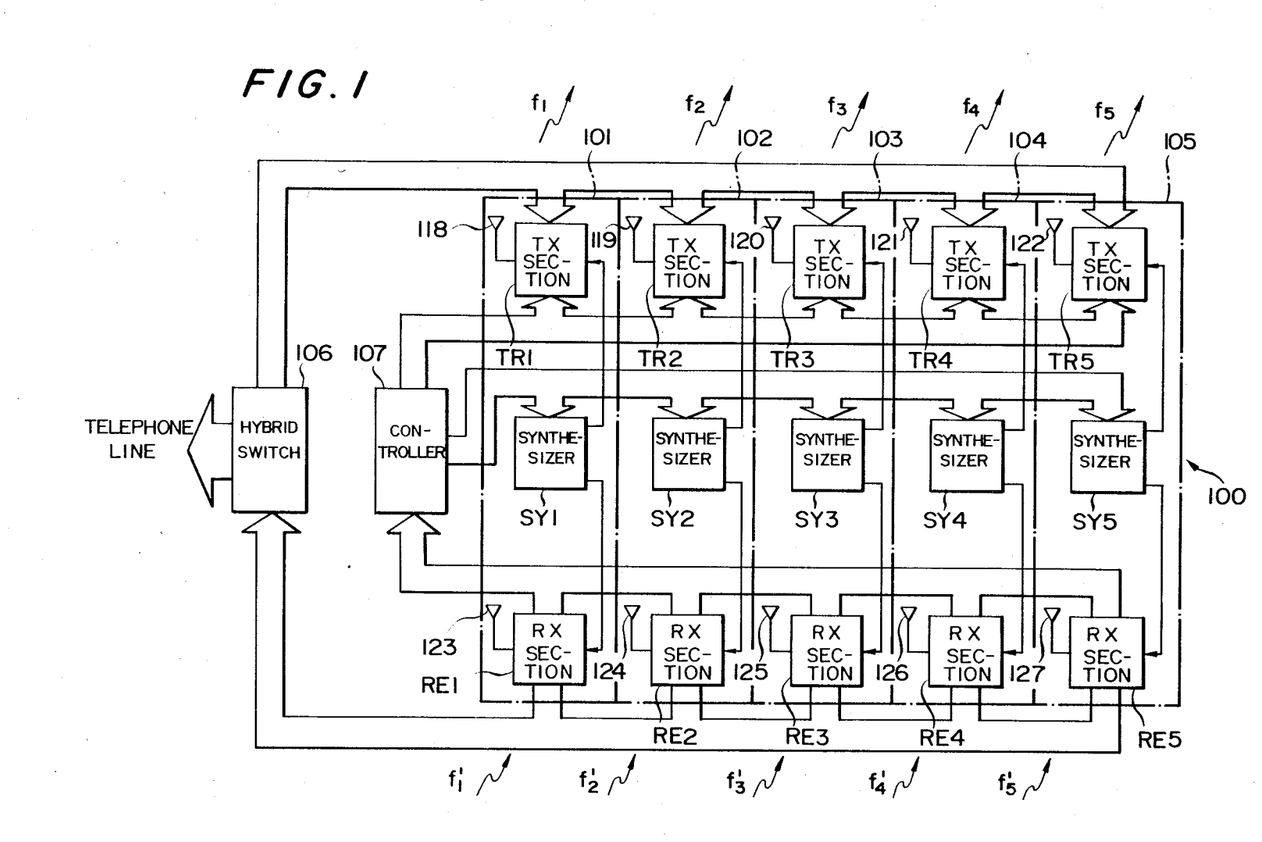
FIG. 1 is a block diagram showing a specific construction of a base unit of a cordless telephone system embodying the present invention.
Figure 2:
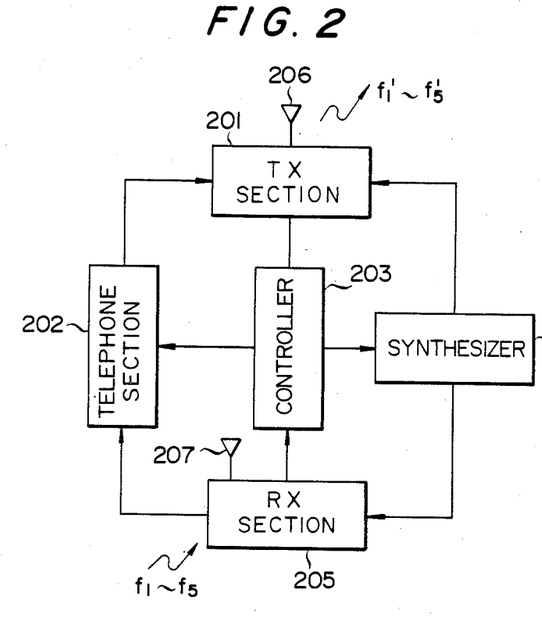
FIG. 2 is a block diagram showing a specific construction of a portable unit of the system in accordance with the present invention.

Referring to FIGS. 1 and 2, there are shown, respectively, a specific construction of a base communication unit and that of a portable communication unit which constitute a cordless telephone system of the present invention. In this particular embodiment, the system is assumed to be connected to five telephone connections.

Figure 3:
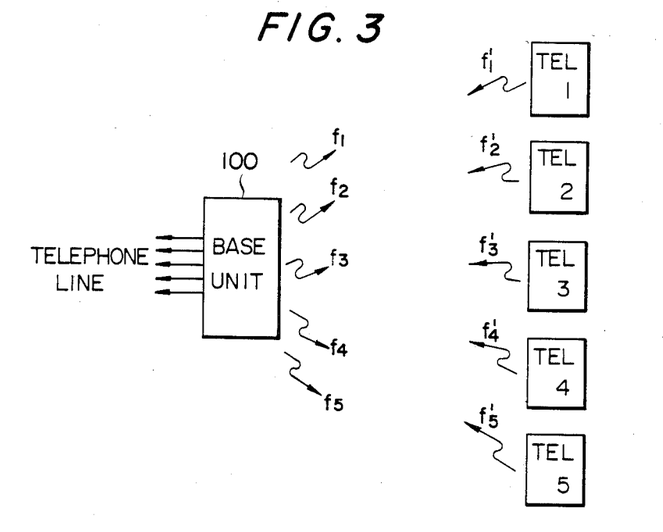
FIG. 3 is a block diagram schematically showing the entire system of the present invention.

As shown in FIG. 1, the base unit, generally 100, includes duplex radio transceivers 101 to 105 each being assigned to a respective one of the five telephone lines, a hybrid switch 106 for selectively connecting the transceivers 101 to 105 to the telephone lines, and a controller 107. The transceivers 101 to 105 include, respectively, transmit sections TR1 to TR5, receive sections RE1 to RE5, synthesizers SY1 to SY5, transmit antennas 118 to 122, and receive antennas 123 to 127. As shown in Fig. 2, the portable unit consists of a transmit section 201, a telephone section 202, a controller 203, a synthesizer 204, a receive section 205, a transmit antenna 206, and a receive antenna 207. The overall arrangement of the system of the present invention is shown in FIG. 3. In FIG. 3, there are shown five portable units, or telephone sets, TEL1 to TEL5 which are connected to the base unit 100 by wireless communication links at transmit frequences $f'_1$ to $f'_5$ and receive frequencies $f_1$ to $f_5$, respectively.

Figure 4A:
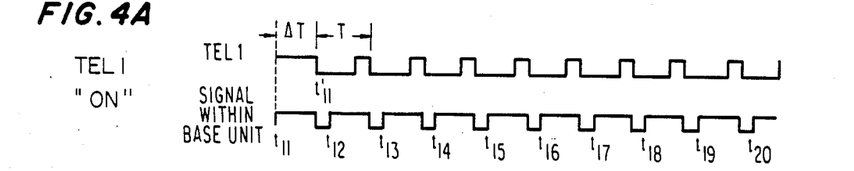
FIGS. 4A to 4E are charts demonstrating exemplary BS operations which occur when the portable units in accordance with the present invention are powered one after another.

FIGS. 4A to 4E demonstrates BS operations occurring when the portable units TEL1 to TEL5 are powered one after another. First, when the portable unit TEL1 is powered in a condition wherein only the base unit 100 has been powered, the portable unit TEL1 sends a POWER-ON signal to the base unit 100. The base unit 100 responsive to the POWER-ON signal transmits a BS period designate signal to the portable unit TEL1 at a predetermined timing $t_{11}$ and, at the same time, registers the unit TEL1 in a storage which is built in the controller 107. In response to the BS period designate signal, the portable unit TEL1 enters into a BS operation at a particular period as designated by the BS period designate signal and on the lapse of a period of time $\Delta T$ since the timing $t_{11}$, i.e. at a timing $t'_{11}$. The procedure described so far is shown in FIG. 4A.

Figure 4B:
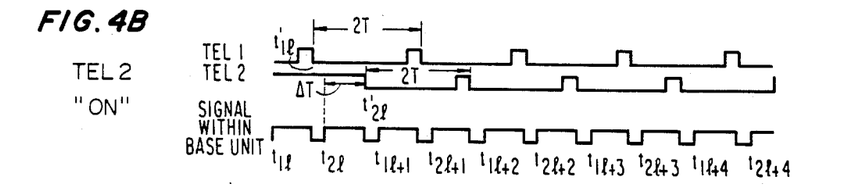

When the second portable unit, e.g., portable unit TEL2 is powered, it sends a POWER-ON signal to the base unit 100 in the same manner as the first portable unit TEL1. Then, the base unit 100 delivers BS period designate signals to the portable units TEL1 and TEL2 at timings $t_{11}$ and $t_{21}$, respectively. At this instant, the controller 107 of the base unit 100 registers the portable units TEL1 and TEL2 in its storage in the order of powering. The portable unit TEL1 changes its BS period from the previous T to 2T receiving the BS period designate signal at a timing $t'_{11}$. The portable unit TEL2, on the other hand, responds to the BS period designate signal by beginning a BS operation at the period of 2T on the lapse of a period of time $\Delta T$ since the timing $t_{21}$, i. e. at a timing $t'_{21}$. Such a procedure is shown in FIG. 4B.

Figure 4C:
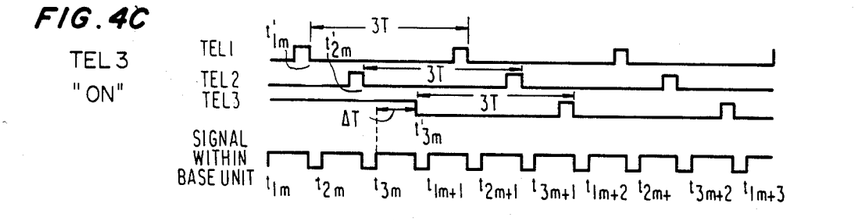
Figure 4D:
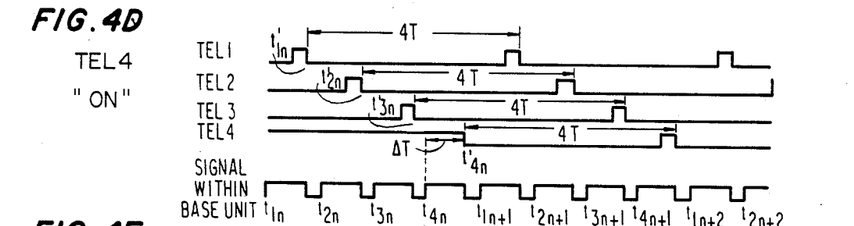
Figure 4E:
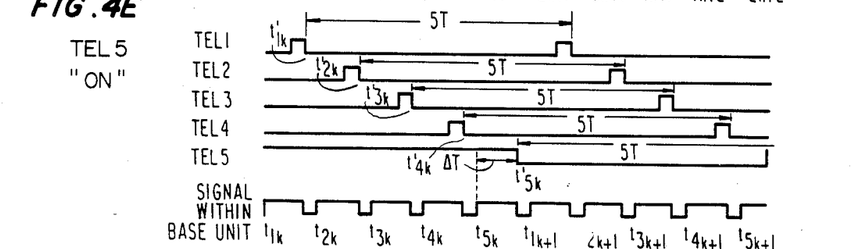
Figure 5A:
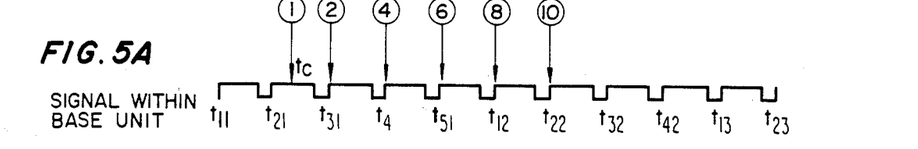
FIGS. 5A to 5F are charts representative of exemplary changeover of the BS operations which occurs in response to the receipt of a call.
Figure 5B:
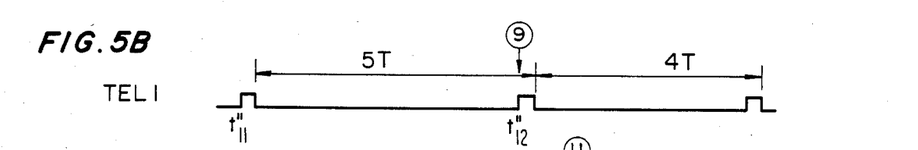
Figure 5C:
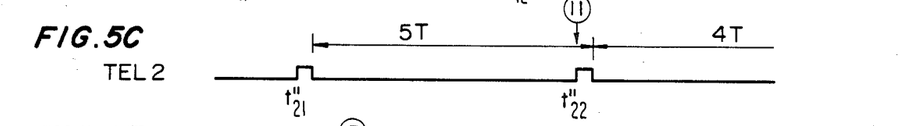
Figure 5D:
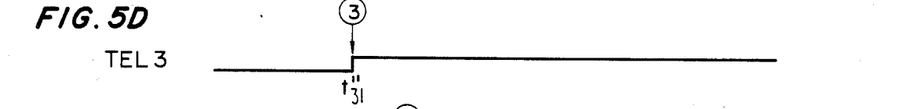
Figure 5E:
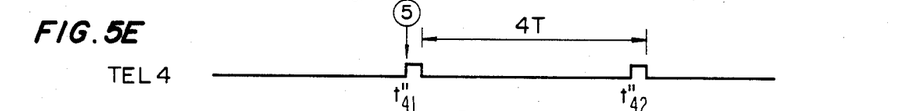
Figure 5F:
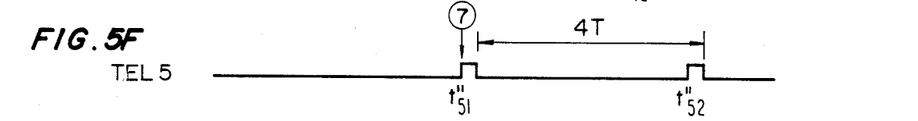
Figure 6A:
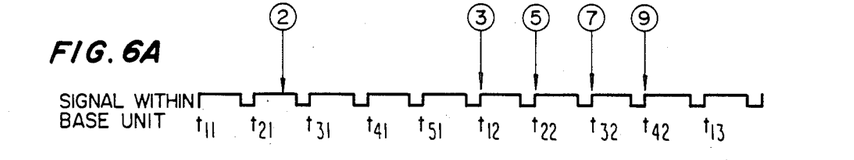
FIGS. 6A to 6F are charts representative of exemplary changeover of the BS operations occurring when a call is originated within the system of the present invention.
Figure 6B:
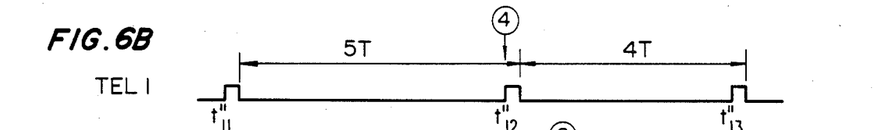
Figure 6C:
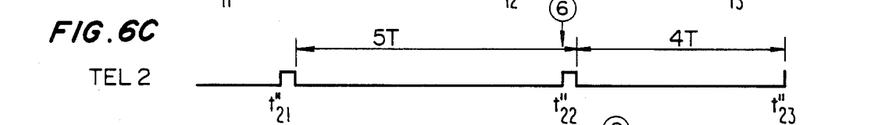
Figure 6D:
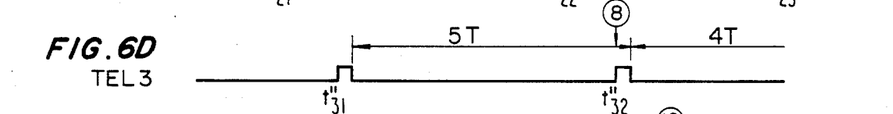
Figure 6E:
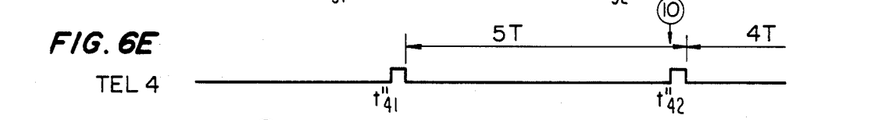
Figure 6F:
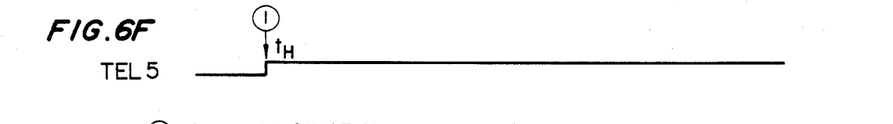
Figure 7A:
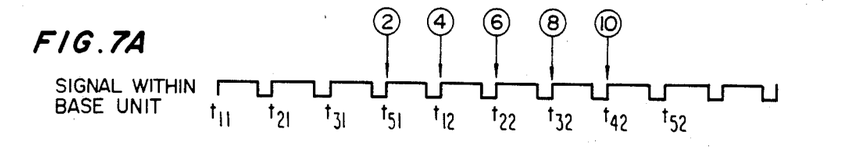
FIGS. 7A to 7F are charts representative of exemplary changeover of the BS operations occurring when a communication on the system of the present invention is terminated.
Figures 7B, 7C, 7D:
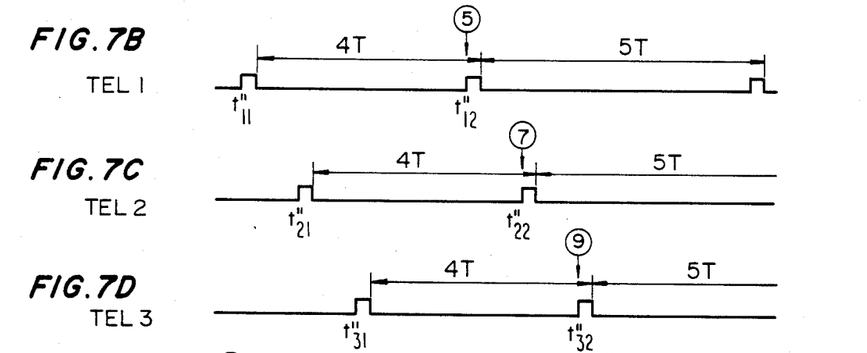
Figure 7E:
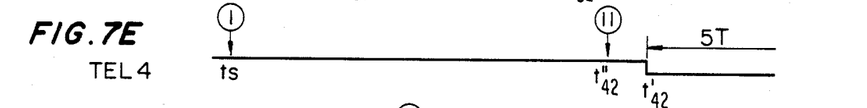
Figure 7F:
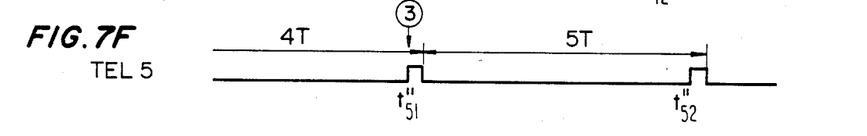

When the third, fourth and fifth portable units TEL are powered one after another, they enter into BS operations individually through the above procedure, as shown in FIGS. 4C to 4E. In the condition shown in FIG. 4E, the controller 107 of the base unit 100 has registered the portable units TEL1, TEL2, TEL3, TEL4 and TEL5 in this order in its storage, and those portable units are performing BS operations in the same order and in synchronism with a signal which is generated within the base unit 100.

What occurs in response to an incoming call under the condition of FIG. 4E will be described with reference to FIGS. 5A to 5F. Assuming that a call is received at a timing $t_c$ between timings $t_{21}$ and $t_{31}$, then the base unit 100 connects a particular telephone line connection over which the call has been received to the transceiver 103 and, by using the transmit section TR3, delivers a call receipt signal to the portable unit TEL3 at the timing $t_{31}$. Receiving the call receipt signal at a timing $t''_{31}$, the portable unit TEL3 interrupts its BS operation and, instead, performs a connecting operation. Meanwhile, the base unit 100 sends BS period designate signals to the other portable units TEL4, TEL5, TEL1 and TEL2 at timings $t_{41}$, $t_{51}$, $t_{12}$ and $t_{22}$, respectively. Receiving the BS period designate signals at, respectively, timings $t''_{41}$, $t''_{51}$, $t''_{12}$ and $t''_{22}$, the portable units TEL4, TEL5, TEL1 and TEL2 change their BS period to 4T as designated. Thereafter, the portable units TEL1, TEL2, TEL4 and TEL5 repeat their BS operations in that order. In short, in response to an incoming call, the base station 100 connects the busy telephone line to one of the portable units TEL which becomes BS-OFF (i. e. receive section ON) first after the time of receipt of the call and, at the same time, sequentially changes the BS periods of the other portable units TEL, starting from the unit TEL which becomes BS-OFF next. This causes the units TEL other than the one which has been connected to the telephone line to perform BS operations at equal intervals according to the order which is registered in the storage of the controller 107.

FIGS. 6A to 6F show how the BS operations are effected when a call is originated in the system under the condition of FIG. 4E. Assuming that a call is placed on the portable unit TEL5 at a timing $t_H$, then the unit TEL5 immediately stops its BS operation and enters into a connecting operation. The base station 100 sends a BS period designate signal to the portable unit TEL1, which is to become BS-OFF after the unit TEL5, at a timing $t_{12}$ just before the BS-OFF timing of the unit TEL1. Subsequently, the base station 100 transmits BS period designate signals to the portable units TEL2, TEL3 and TEL4 in this order and at timings $t_{22}$, $t_{32}$ and $t_{42}$, respectively. Receiving those signals at, respectively, timings $t''_{12}$, $t''_{22}$, $t''_{32}$ and $t''_{42}$, the portable units TEL1, TEL2, TEL3 and TEL4 change their BS periods to 4T as designated. As a result, the portable units TEL other than the one which has performed the connecting operation are caused to enter into BS operations at equal intervals according to the order which is stored in the controller 107 of the base unit 100, as has been the case with the receipt of a call.

Referring to FIGS. 7A to 7F, there is shown a change in the BS operations which occurs when a communication is terminated. Assume that the portable unit TEL4 which is in communication has its hook switch turned on at a timing $t_S$ to terminate the communication. Sensing the termination of the communication, the base unit 100 sends a BS period designate signal to the portable unit TEL5, which is to become BS-OFF after the portable unit TEL4, at a timing $t_{51}$ just before the BS-OFF timing of the unit TEL5. Subsequently, the base unit 100 sequentially delivers BS period designate signals to the portable units TEL1, TEL2, TEL3 and TEL4 in this order and at timings $t_{12}$, $t_{22}$, $t_{32}$ and $t_{42}$, respectively. In response, the portable units TEL5, TEL1, TEL2 and TEL3 change their BS periods to 5T as designated, at individual timings of $t''_{51}$, $t''_{12}$, $t''_{22}$ and $t''_{32}$ at which they receive the BS period designate signals. The portable unit TEL4 receives the BS period designate signal at a timing $t'''_{42}$ and starts on a 5T BS operation at a timing $t'_{42}$. Consequently, the portable units TEL1 to TEL5 sequentially enter into BS operations based on the particular order which is registered in the storage of the controller 107 of the base unit 100.

While the above description has concentrated on the changes in BS operations which are caused by the receipt of a call, the origination of a call, and the termination of a call each using a single telephone line, it will be understood that even when two more telephone lines are used simultaneously, the portable units TEL surely perform BS operations through the same procedure in a registered order and at a period which is produced by multiplying the unit period T of the internally generated signal of the base unit 100 by the number of currently usable circuits.

Figures 8A, 8B, 8C, 8D, 8E:
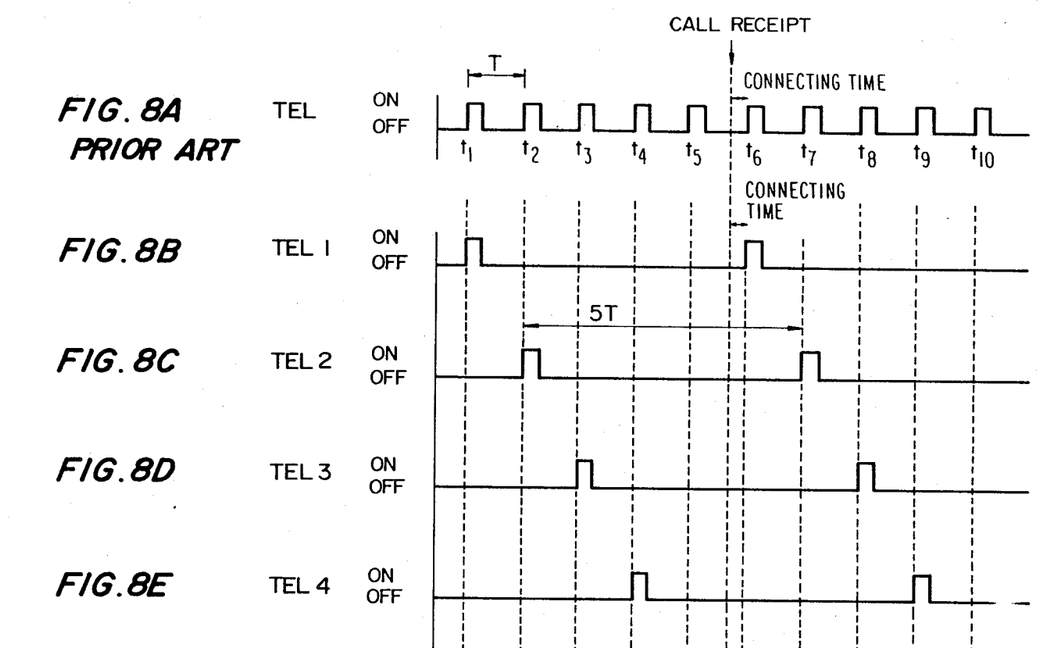
FIGS. 8A to 8F are charts useful for explaining a difference between the BS operation of a prior art cordless telephone system and a cordless telephone system of the present invention.
Figure 8F:
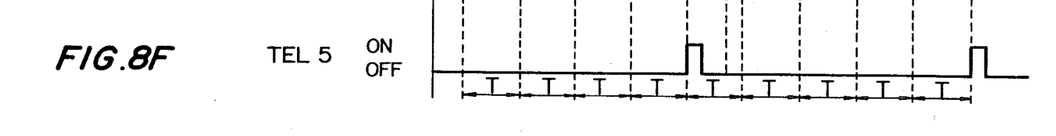

FIGS. 8A to 8F show a difference between the cordless telephone system of the present invention and a prior art cordless telephone system. Specifically, FIG. 8A is representative of a prior art system in which a portable unit TEL performs a BS operation at a period of T, while FIGS. 8B to 8F are representative of the system of the present invention in which the portable units TEL1 to TEL5 sequentially perform BS operations at a period of 5T each. It will be seen that the system of the present invention achieves fives times greater power saving effect than the prior art system and, yet, the period of time necessary for connection in the event of receipt of a call remains the same despite the longer BS periods.

In summary, it will be seen that in accordance with the present invention the BS period of idle portable communication units TEL are changed at adequate timings based on the number of telephone lines used, so that the units TEL sequentially perform intermittent receipt at equal intervals of T. Therefore, a BS period which is a product of the period T and the number of telephone lines used suffices, whereby the power consumed by each portable unit TEL is reduced.

Various modifications will become possible for those skilled in the art after receiving the teachings of the present disclosure without departing from the scope thereof.

What is claimed is:

1. A cordless telephone system comprising:

a base communication unit connected to a plurality of telephone lines and having the same number of radio transceivers as said telephone lines; and portable communication units equal in number to said telephone lines and each being connected to a respective one of said transceivers of said base communication unit by a cordless communication link;

each of said portable communication units being intermittently rendered operative at a particular timing and at a predetermined period which are designated by a first signal transmitted from said base communication unit, said first signal being produced in said base communication unit based on the number of portable communication units turned ON, said particular timing and predetermined period being changed in response to a second signal transmitted from said base communication unit, said second signal being produced in said base communication unit based on the number of portable communication units turned ON, and on the number of wireless communication links being used.

2. A cordless telephone system as claimed in claim 1, wherein each of the transceivers comprises a transmit section, a receive section, a synthesizer connected to both the transmit section and the receive section, a transmit antenna connected to the transmit section, and a receive antenna connected to the receive section.

3. A cordless telephone system as claimed in claim 1, further comprising a hybrid switch for switchingly connecting the transceivers to the telephone lines.

4. A cordless telephone system as claiemd in claim 1, further comprising a controller for controlling the transceivers.

5. A cordless telephone system as claimed in claim 1, wherein each of the portable communication units comprises a transmit section, a receive section, a synthesizer and a telephone section which are connected to both the transmit section and the receive section, a transmit antenna connected to the transmit section, a receiver antenna connected to the receive section, and a controller for controlling said transmit section, receive section, synthesizer, and telephone section.

* * * * *